United States Patent
Peters et al.

(10) Patent No.: US 12,548,070 B2
(45) Date of Patent: Feb. 10, 2026

(54) DYNAMIC AUGMENTED REALITY AND GAMIFICATION EXPERIENCE FOR IN-STORE SHOPPING

(71) Applicant: Maplebear Inc., San Francisco, CA (US)

(72) Inventors: Andrew Peters, Tiburon, CA (US); Dominic Cocchiarella, Berkeley, CA (US); Brandon Leonardo, San Carlos, CA (US); David McIntosh, San Francisco, CA (US); Varouj Chitilian, Hillsborough, CA (US)

(73) Assignee: Maplebear Inc., San Francisco, CA (US)

( * ) Notice: Subject to any disclaimer, the term of this patent is extended or adjusted under 35 U.S.C. 154(b) by 397 days.

(21) Appl. No.: 18/072,487

(22) Filed: Nov. 30, 2022

(65) Prior Publication Data

US 2024/0177226 A1 May 30, 2024

(51) Int. Cl.
*G06Q 30/0251* (2023.01)
*G06Q 30/0207* (2023.01)
(Continued)

(52) U.S. Cl.
CPC ..... *G06Q 30/0643* (2013.01); *G06Q 30/0209* (2013.01); *G06Q 30/0255* (2013.01);
(Continued)

(58) Field of Classification Search
CPC ........... G06Q 30/0643; G06Q 30/0631; G06Q 30/0207–0277; H04W 4/021
(Continued)

(56) References Cited

U.S. PATENT DOCUMENTS

2007/0198347 A1* 8/2007 Muldoon ........... G06Q 30/0224
705/14.35
2011/0015983 A1* 1/2011 Bonnat .............. G06Q 30/0225
705/14.26

(Continued)

OTHER PUBLICATIONS

H. Omead Sinai, "5 Innovative Examples of Augmented Reality in Retail", available on Jan. 6, 2021, retrieved from https://rockpaperreality.com/insights/ar-use-cases/augmented-reality-in-retail/ (Year: 2021).*

*Primary Examiner* — Sam Refai
(74) *Attorney, Agent, or Firm* — Fenwick & West LLP

(57) ABSTRACT

A computing platform may receive, from a user device, historical shopping information indicating previously purchased items and/or previous routes within shopping environments for a first user of the user device. The computing platform may input, into a shopping gamification model, the historical shopping information, which may output shopping recommendation information indicating one or more of: recommended items or recommended routes within a first shopping environment. The computing platform may send, to the user device, a shopping gamification interface that includes the shopping recommendation information and one or more commands directing the user device to display the shopping gamification interface. The computing platform may receive, from the user device, user feedback information indicating acceptance or rejection of the shopping recommendation information by the first user. The computing platform may update, based on the user feedback information, the shopping gamification model.

18 Claims, 9 Drawing Sheets

(51) Int. Cl.
*G06Q 30/0601* (2023.01)
*H04W 4/021* (2018.01)
(52) U.S. Cl.
CPC ..... *G06Q 30/0261* (2013.01); *G06Q 30/0271* (2013.01); *G06Q 30/0631* (2013.01); *H04W 4/021* (2013.01)
(58) Field of Classification Search
USPC .............................................. 705/14.1–14.73
See application file for complete search history.

(56) References Cited

U.S. PATENT DOCUMENTS

| | | | |
|---|---|---|---|
| 2014/0330645 A1* | 11/2014 | Craft | G06Q 30/0255 |
| | | | 705/14.53 |
| 2019/0184291 A1* | 6/2019 | Patton | A63F 13/69 |
| 2019/0244436 A1* | 8/2019 | Stansell | G06Q 30/0643 |
| 2022/0076286 A1* | 3/2022 | Rakshit | H04L 67/131 |
| 2023/0071653 A1* | 3/2023 | Haze | G06Q 30/0631 |

* cited by examiner

DYNAMIC AUGMENTED REALITY AND GAMIFICATION EXPERIENCE FOR IN-STORE SHOPPING

BACKGROUND

Shopping may be conducted in a variety of forms including on-line and in-store. In some instances, individuals may receive advertisements and/or promotions for products that may be of particular interest to them. During in-store shopping experiences, however, such promotions might not be tied to the current in-store shopping experience. For example, promotions may be provided for products not available within the in-store shopping experience (e.g., that may, e.g., be available at other stores instead). This may result in a sub-optimal in-store experience for such individuals. Furthermore, location information corresponding to such advertisements and/or promotions might not be provided, which may result in inefficiencies related to the in-store experience. Accordingly, it may be important to provide a mechanism to improve and/or facilitate recommendations within an in-store shopping experience.

SUMMARY

One or more illustrative aspects of the disclosure may be directed to a computing platform, including a memory, one or more processors, and a communication interface, where the memory stores one or more computer-readable instructions that, when executed by the one or more processors, cause the computing platform to receive, from a user device, historical shopping information indicating one or more of: previously purchased items or previous routes within shopping environments for a first user of the user device. The computing platform may input, into a shopping gamification model, the historical shopping information, where the shopping gamification model outputs, based on the historical shopping information, shopping recommendation information indicating one or more of: recommended items or recommended routes within a first shopping environment. The computing platform may send, to the user device, a shopping gamification interface that includes the shopping recommendation information and one or more commands directing the user device to display the shopping gamification interface, which may cause the user device to display the shopping gamification interface. The computing platform may receive, from the user device, user feedback information indicating acceptance or rejection of the shopping recommendation information by the first user. The computing platform may dynamically update, based on the user feedback information, the shopping gamification model, including: using the user feedback information for the first user to inform future recommendations for the first user and for other users, different than the first user, and refining the shopping gamification model to identify, for any given input: a first subset of shopping recommendations for the given input with a corresponding likelihood of acceptance that exceeds a predetermined acceptance threshold, and a lowest monetary cost recommendation, of the first subset of the shopping recommendations for the given input, where outputting the shopping recommendation information may include outputting the lowest monetary cost recommendation.

In one or more instances, the computing platform may monitor a location of the user device to detect that the user device has entered a geofence corresponding to the first shopping environment, which may trigger input of the historical shopping information into the shopping gamification model. In one or more instances, the historical shopping information may correspond only to the first shopping environment.

In one or more examples, the historical shopping information may correspond to a plurality of shopping environments including the first shopping environment. In one or more examples, the computing platform may input, into the shopping gamification model, a location of the user device within the first shopping environment, where the shopping gamification interface may be dynamically updated based on the location of the user device within the first shopping environment.

In one or more instances, the computing platform may input, into the shopping gamification model, dietary preference information for the first user, where the shopping recommendation information may be based on the dietary preference information. In one or more instances, the shopping gamification interface may include: one or more virtual coins corresponding to locations of items, included in the shopping recommendation information, within the first shopping environment, and a recommended route through the first shopping environment to obtain the one or more virtual coins.

In one or more examples, the one or more virtual coins may include one or more of: promotions, points, discounts, or themes. In one or more examples, the one or more virtual coins may be redeemed at checkout via a scan and pay system.

In one or more instances, the computing platform may detect that a location of the user device is within a geofence corresponding to an item associated with the one or more coins. Based on the detection that the location of the user device is within the geofence, the computing platform may trigger a live response at a computing device corresponding to the location, which may be a visual response and/or an audio response.

In one or more examples, the shopping gamification interface may include an augmented reality interface, and the shopping gamification interface may be configured to obscure one or more items at the location of the user device based on dietary preferences of the first user. In one or more examples, the shopping gamification interface may include an avatar for the first user.

In one or more instances, the user device may be a mobile device, an augmented reality device, an intelligent shopping cart, or other computing device. In one or more instances, the user feedback information may indicate that a first recommended item was skipped by the first user, and the shopping gamification interface may be updated, based on the user feedback information, to remove a second recommended item from the shopping gamification interface.

In one or more examples, the user feedback information may indicate that a first recommended item was accepted by the first user, and the shopping gamification interface may be updated, based on the user feedback information, to add a second recommended item to the shopping gamification interface. In one or more examples, the likelihood of acceptance may be based on historical acceptance information from a plurality of users, including the first user and at least one other user, different than the first user.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
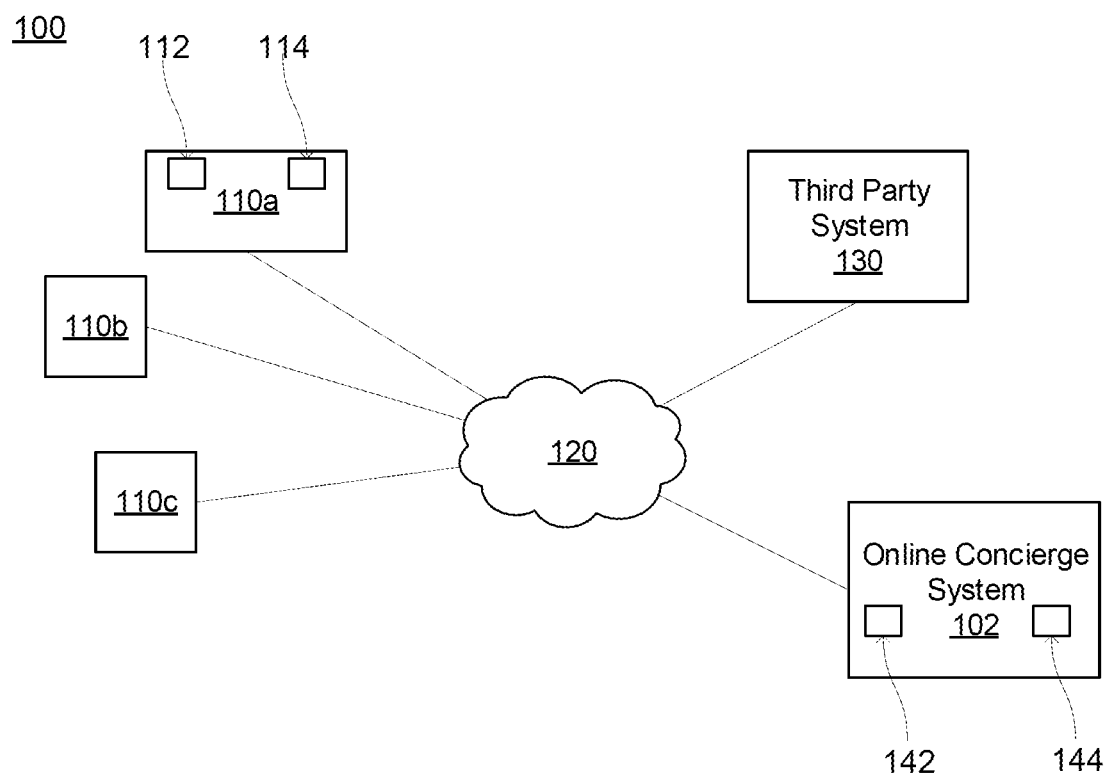
FIG. 1 is a block diagram of a system environment in which an online system, such an online concierge system, operates, according to one or more illustrative embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. Additionally or alternatively, the client device 110 may be and/or include an augmented reality device/component/capabilities and/or may correspond to an intelligent shopping cart. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a," "110b," and/or "110c" in the figures. In various embodiments, a client device 110 includes a memory 114 comprising a non-transitory storage medium on which instructions are stored. The memory 114 may have instructions stored thereon that, when executed by the processor 112, cause the processor to perform functions to execute the customer mobile application 206 or the shopper mobile application 212 to provide the functions further described above in conjunction with FIGS. 4A and 4B, respectively.

The client device 110 may be configured to communicate via the network 120, which may comprise any combination of local area and/or wide area networks, using both wired and/or wireless communication systems. In one or more embodiments, the network 120 uses standard communications technologies and/or protocols. For example, the network 120 may include communication links using technologies such as Ethernet, 802.11, worldwide interoperability for microwave access (WiMAX), 3G, 4G, 5G, code division multiple access (CDMA), digital subscriber line (DSL), etc., and/or combinations thereof. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one or more embodiments, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions stored thereon corresponding to the modules further below in conjunction with FIG. 3 that, when executed by the processor 142, cause the processor to perform the functionality further described above in conjunction with FIGS. 2 and 5A-7D. For example, the memory 144 has instructions encoded thereon that, when executed by the processor 142, cause the processor 142 to provide a dynamic augmented reality and gamified shopping experience in accordance with one or more illustrative aspects described herein. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device 110, a third party system 130, or the online concierge system 102 may be special purpose computing devices configured to perform specific functions, as further described below in conjunction with FIGS. 2-7D, and may include specific computing components such as processors, memories, communication interfaces, and/or the like.

System Overview

Figure 2:
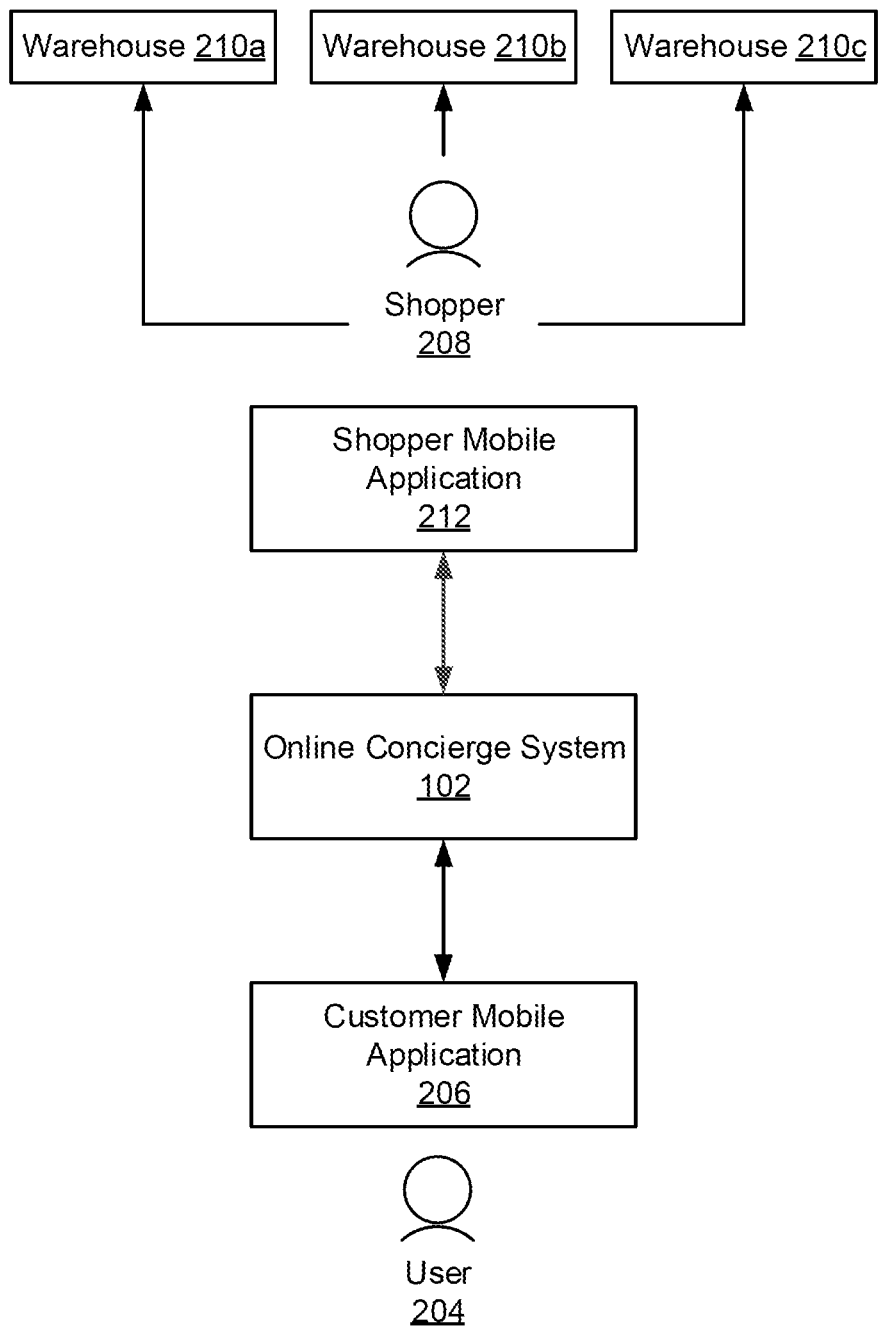
FIG. 2 illustrates an environment of an online shopping concierge service, according to one or more illustrative embodiments.

FIG. 2 illustrates an environment 200 of an online platform according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 may include an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

In some instances, one or more shoppers 208 may communicate with the online concierge system 102 to fulfill the above described user orders. For example, the online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one or more embodiments, shoppers 208 make use of a shopper mobile application 212 which is configured to interact with the online concierge system 102.

Figure 3:
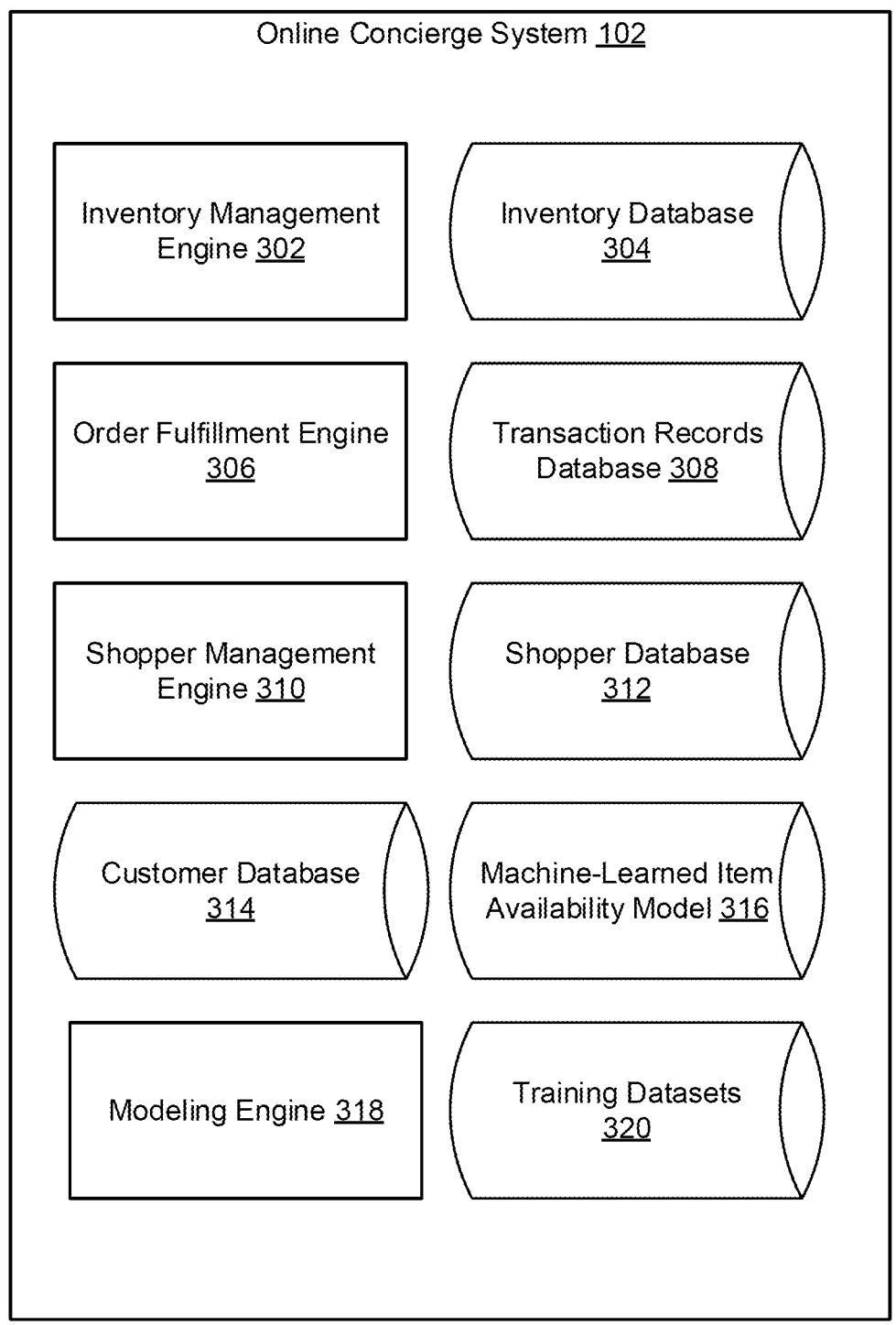
FIG. 3 is a diagram of an online shopping concierge system, according to one or more illustrative embodiments.

FIG. 3 is a functional diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about items, including size, color, weight, SKU, serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found (e.g., a number of times the item is located divided by a number of times that the item is searched for), and the popularity of the item (e.g., a number of requests for the item).

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210 (FIG. 2). For example, the inventory management engine 302 receives an item catalog from a warehouse 210 (FIG. 2) identifying items offered for purchase by the warehouse 210. From the item catalog, the inventory management engine 302 determines a taxonomy of items offered by the warehouse 210 (FIG. 2). Different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 (FIG. 2) in various embodiments. In other embodiments, the inventory management engine 302 applies a trained classification module to an item catalog received from a warehouse 210 (FIG. 2) to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 might not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine-learned item availability model 316. The order fulfillment engine 306 determines a sale price for each item ordered by a user (e.g., user 204 of FIG. 2). Prices set by the order fulfillment engine 306 may or might not be identical to in-store prices determined by retailers (which is the price that users 204 and shoppers 208 would pay at the retail warehouses). The order fulfillment engine 306 also facilitates transactions associated with each order. In one or more embodiments, the order fulfillment engine 306 charges a payment instrument associated with a user (e.g., user 204 of FIG. 2) when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via a customer mobile application (e.g., application 206 of FIG. 4 described below). The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses (e.g., warehouses 210 of FIG. 2). For example, after successful fulfillment of an order, the order fulfillment engine 306 may transmit a summary of the order to the appropriate warehouses (e.g., warehouses 210 of FIG. 2). The summary may indicate the items purchased, the total value of the items, and in some cases, an identity of a shopper (e.g., shopper 208 of FIG. 2) and a user (e.g., user 204 of FIG. 2) associated with the transaction. In one or more embodiments, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers (e.g., shopper 208 of FIG. 2). In one or more embodiments, the shopper management engine 310 receives a new order from the order fulfillment engine 306. The shopper management engine 310 identifies the appropriate warehouse (e.g., warehouses 210 of FIG. 2) to fulfill the order based on one or more parameters, such as a probability of item availability determined by a machine-learned item availability model 316, the contents of the order, the inventory of the warehouses, and the proximity to the delivery location. The shopper management engine 310 then identifies one or more appropriate shoppers (e.g., shopper 208 of FIG. 2) to fulfill the order based on one or more parameters, such as the shoppers' proximity to the appropriate warehouse (e.g., warehouse 210 of FIG. 2) (and/or to the user 204 of FIG. 2), each shopper's familiarity level with that particular warehouse (e.g., warehouse 210 of FIG. 2), and so on. Additionally, the shopper management engine 310 accesses a shopper database 312 which stores information describing each shopper (e.g., shopper 208 of FIG. 2), such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. For example, the order fulfillment engine 306 may delay display of received orders so as to provide shoppers with a batch of orders that may be simultaneously fulfilled (e.g., by the time interval). In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via a shopper mobile application (e.g., shopper mobile application 212 of FIG. 2); if the order fulfillment engine 306 generated one or more batches including the received order and one or more orders received after the received order and during the time interval, the one or more batches are also displayed to one or more shoppers via a shopper mobile application 212 (e.g., shopper mobile application 212 of FIG. 2).

Machine Learning Models

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day, or other timeframes. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items or categories of items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, pharmacy, produce, floral, deli, prepared foods, meat, seafood, dairy, meat department, and/or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302.

In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
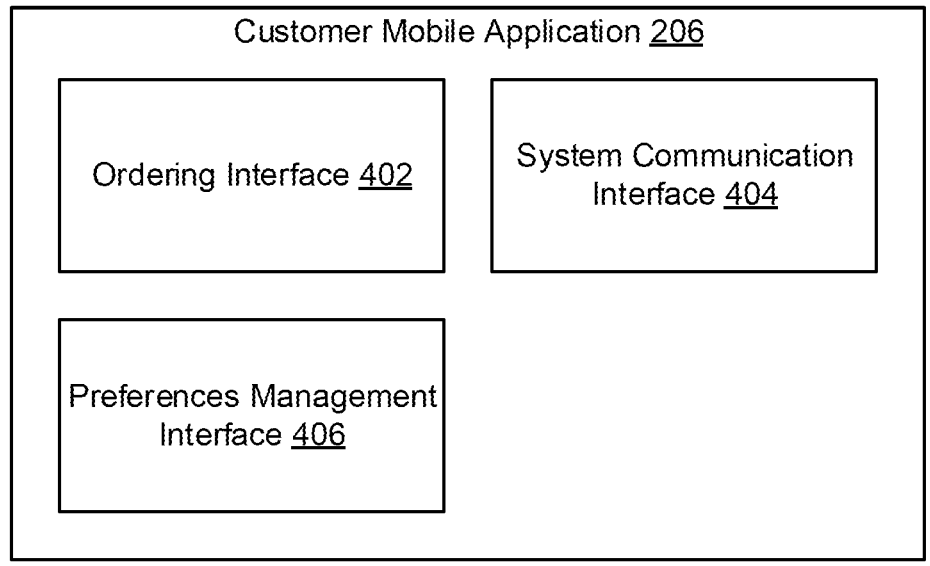
FIG. 4A is a diagram of a customer mobile application (CMA), according to one or more illustrative embodiments.

FIG. 4A is a diagram of the customer mobile application (CMA) 206, according to one or more embodiments. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
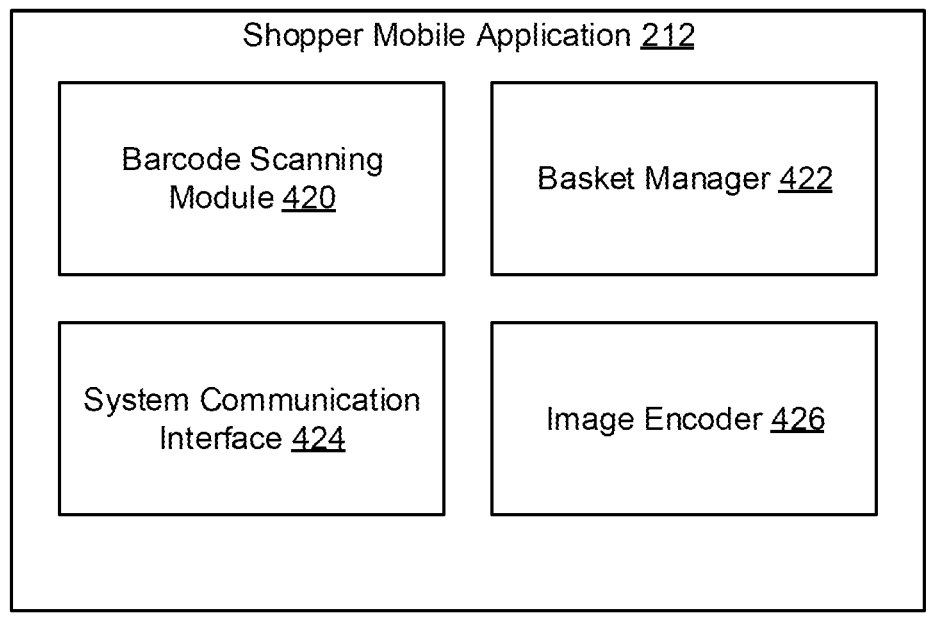
FIG. 4B is a diagram of a shopper mobile application (SMA), according to one or more illustrative embodiments.

FIG. 4B is a diagram of the shopper mobile application (SMA) 212, according to one or more embodiments. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one or more embodiments, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at checkout.

Dynamic Augmented Reality and Gamification Experience for In-Store Shopping

Figure 5A:
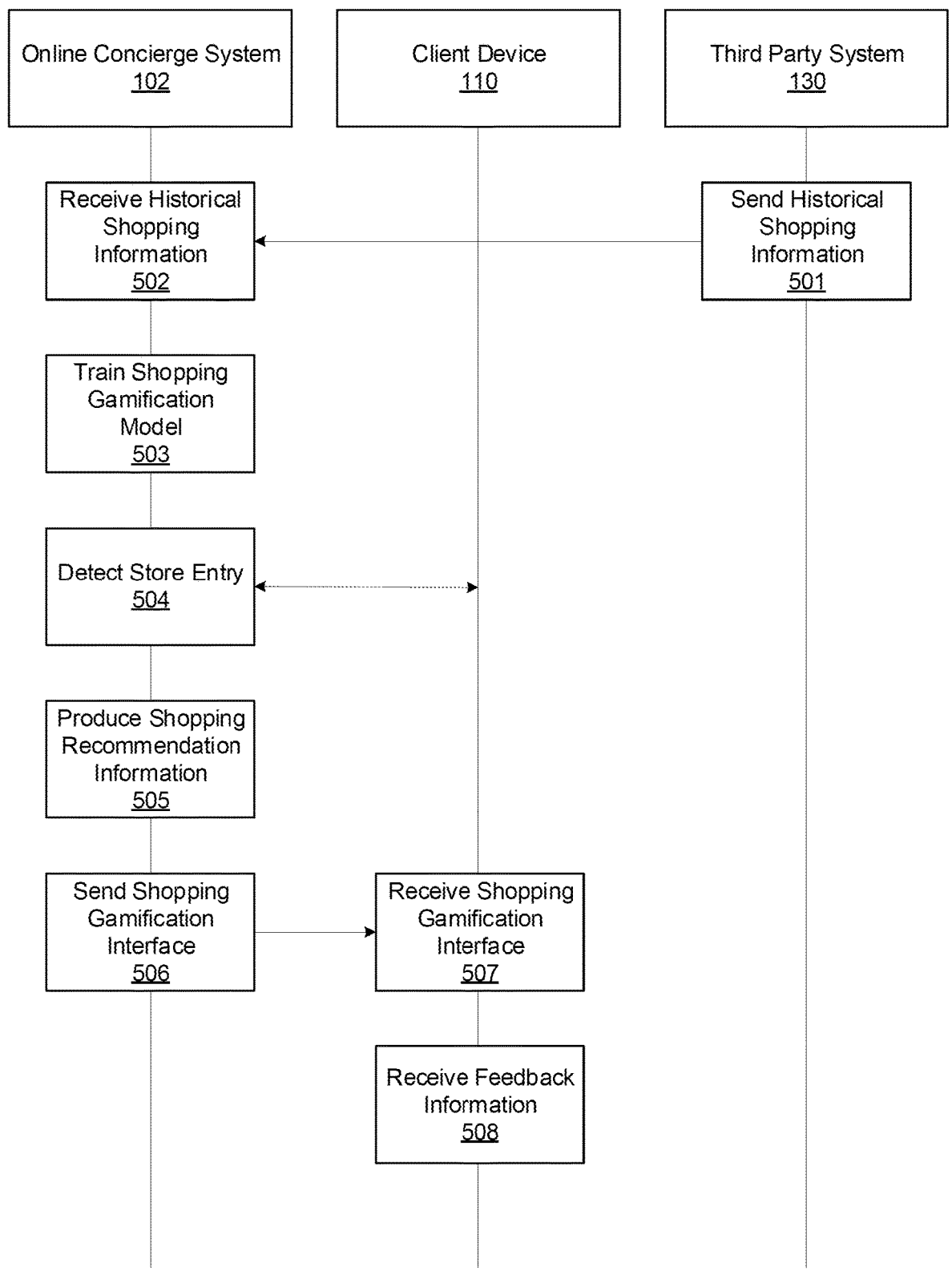
FIGS. 5A-5B depict an illustrative event sequence for a dynamic augmented reality and gamified shopping experience according to one or more illustrative embodiments.
Figure 5B:
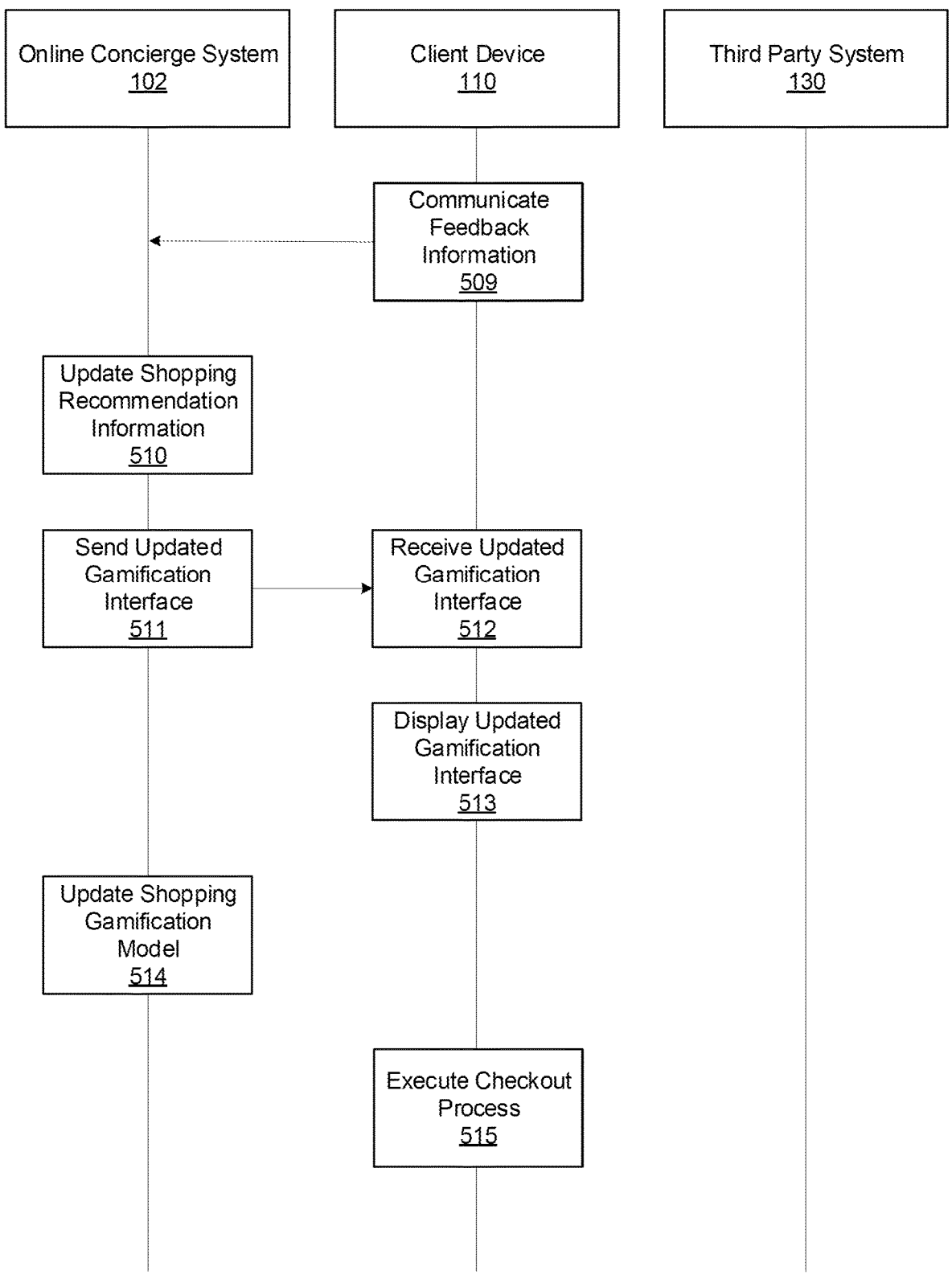

FIGS. 5A-5B depict an illustrative event sequence for a dynamic augmented reality and gamified shopping experience according to one or more illustrative embodiments. At step 501, the third party system 130 may send historical shopping information to the online concierge system 102. For example, the third party system 130 may send, share, or otherwise provide the historical shopping information while a wired and/or wireless data connection is established with the online concierge system 102 (e.g., directly to the online concierge system 102 without sending this information to the client device 110). In some instances, in sending the historical shopping information, the third party system 130 may send information related to one or more users enrolled in a shopping service hosted by the online concierge system 102 (which may, in some instances, be based on receiving consent from the one or more users upon their enrollment or registration with the shopping service). In some instances, in sending the historical shopping information, the third party system 130 may send historically purchased items, historically visited stores, historic shopping trip information (e.g., including routes of user on the corresponding trip, which may, in some instances, involve a route within a single store and/or route between multiple stores), user information (e.g., dietary restrictions, preferences, and/or other information, address information, account balance information, budget information, and/or other information), store specific information (e.g., most popular items, specialty items, item availability, and/or other information). Although the historical shopping information is shown as being sent from the third party system 130, historical shopping information may, in some instances, be collected and/or provided by an internal system (e.g., internal database) and/or other systems (e.g., public data systems) without departing from the scope of the disclosure.

At step 502, the online concierge system 102 may receive the historical shopping information from the third party system 130 (e.g., directly from the third party system 130 without involvement of the client device 110). For example, the online concierge system 102 may receive and/or otherwise access the historical shopping information via a communication interface of the online concierge system 102 and while a wired and/or wireless data connection is established with the third party system.

At step 503, the online concierge system 102 may train a shopping gamification model. For example, the online concierge system 102 may input the historical shopping information into a shopping gamification model to train the shopping gamification model to output shopping recommendation information, including items to which virtual coins should be assigned, and/or an order in which those virtual coins should be accessed (e.g., so as to cause a particular shopping route to be followed) based on the input of a user identity and a store identity. In some instances, in training the shopping gamification model, the online concierge system 102 may use one or more supervised machine learning techniques (e.g., support vector machines, linear regression, logistic regression, decision trees, K-nearest neighbor, neural networks, and/or other supervised machine learning techniques), one or more unsupervised machine learning techniques (e.g., clustering, anomaly detection, and/or other unsupervised learning techniques), and/or other techniques. In some instances, the shopping gamification model may be trained on a per user basis (e.g., so as to only use historical shopping information for a particular individual to output shopping recommendations for that individual). In other instances, the shopping gamification model may be trained to use information (e.g., the historical shopping information described above at step 501) from a plurality of similarly situated individuals (e.g., based on geographical region (state, county, zip code, and/or other information), demographic information, budget information, account information, historical purchases, and/or otherwise) to inform outputs for a given individual.

At step 504, the online concierge system 102 may detect entry of the client device 110 into a store (and/or within a geofence that corresponds to the store, which may, in some instances, include a boundary around the store). In some instances, the online concierge system 102 may continuously monitor a location of the client device 110 (e.g., based on global positioning system (GPS) information, or the like). Additionally or alternatively, the online concierge system 102 may be notified by the client device 110 (and/or otherwise detect) upon entry of the client device 110 into the geofence. In some instances, in detecting the entry, the online concierge system 102 may receive both information of the store and information of the user.

At step 505, the online concierge system 102 may input the detected device and/or user information into the shopping gamification model to produce shopping recommendation information. For example, the online concierge system 102 may use the shopping gamification model to identify recommended items and/or shopping routes for the user based on historical information (e.g., historical preference information, inventory levels, and/or other information described above in the training of the shopping gamification model at step 501) for the user and/or other users so as to provide a personalized recommendation. In some instances, the online concierge system 102 may input the detected device and/or user information into the shopping gamification model based on or in response to the detection of entry into the store and/or corresponding geofence.

In some instances, identifying the shopping recommendation information may include identifying, for a plurality of items available in the store, a likelihood of purchase. For example, the shopping gamification model may include historical shopping information indicating a number of times a particular item was recommended to users, and a number of times that the particular item was purchased when recommended (e.g., to the specific user, to similarly situated users, to all users, in the specific store, in all stores, and/or otherwise). In these instances, the shopping gamification model may be configured to rank available items based on these likelihoods, and to select a threshold number (e.g., 5, 10, or other number) of these items with the highest likelihoods of purchase. For example, the shopping gamification model may employ the following selection model: likelihood of purchase=instances of purchase/instances of recommendation; rank results based on likelihood of purchase scores; select 10 items with highest scores. In some instances, a subset of the recommended items may be provided to the user based on the likelihoods of acceptance for each item in the subset exceeding a predetermined acceptance threshold.

Additionally or alternatively, the shopping gamification model may employ a function for selecting items based on cost. For example, the shopping gamification model may identify a plurality of items corresponding to an identified item type (e.g., a particular type of cereal, chips, cookies, or the like), and may identify a lowest cost option within the plurality. In these instances, this lowest cost option may be output within the shopping recommendation information.

In some instances, the shopping gamification model may identify a recommended shopping route once the recommended shopping items are identified. In these instances, the shopping gamification model may be trained to identify a distance between an entrance of the store and each of the recommended shopping items. The shopping gamification model may be configured to rank these items based on the identified distances, and select the item with the lowest distance. The shopping gamification model may then repeat this process for the selected item (e.g., which remaining item is closest to the selected item), and may extend a recommended route from the entrance, to the first item, and then to the second item. The shopping gamification model may continue to repeat this process until an identified route that includes all recommended items is identified. In some instances, the shopping gamification model may adjust the identified route based on factors other than physical distance. For example, the shopping gamification model may be configured to identify that a likelihood of purchase for the third item increases if the fourth recommended item is collected first (e.g., the user may be more likely to purchase salsa after picking up tortillas due to a flash sale on the tortillas). In these instances, the shopping gamification model may be configured to update the identified route accordingly. In some instances, the recommended shopping route may guide the user through areas of the store and/or to particular items that they might not normally or otherwise visit (e.g., individuals may often visit the same shelves within the same stores, to purchase the same items).

In some instances, in identifying the recommended shopping information, the shopping gamification model may use historical shopping information limited to the user and/or the shopping environment. For example, the shopping gamification model may operate in a constrained universe (e.g., the shopping environment) with a constrained timeframe (e.g., during a shopping experience). In other instances, the shopping gamification model may use historical shopping information from one or more other users, one or more other shopping environments, and/or other information.

Figure 7A:
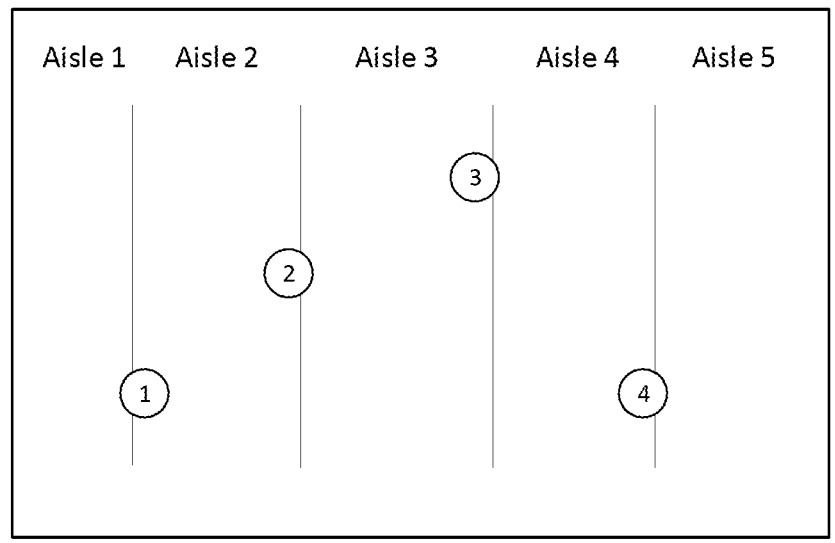
FIGS. 7A-7D depict illustrative user interfaces for a dynamic augmented reality and gamified shopping experience according to one or more illustrative embodiments.
Figure 7B:
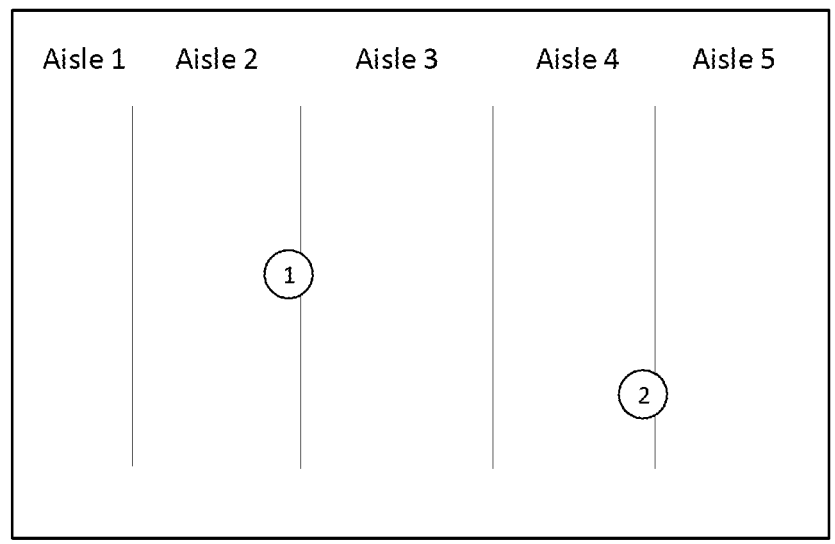

At step 506, the online concierge system 102 may generate a shopping gamification interface based on the shopping recommendation information output by the shopping gamification model. For example, the online concierge system 102 may assign virtual coins to the recommended items of the shopping recommendation information and may assign an order to these virtual coins based on the identified shopping route of the shopping recommendation information. In some instances, these virtual coins may include one or more of: promotions, points, discounts, themes, and/or other information. In these instances, the online concierge system 102 may generate a shopping gamification interface that indicates locations of the virtual coins, along with an order in which they should be collected. For example, the online concierge system 102 may generate a shopping gamification interface similar to shopping gamification interface 705, which is shown in FIG. 7A. In some instances, a user may be able to interact with the shopping gamification interface 705 by zooming in on particular aisles and/or coins to view available promotions, deals, rewards, and/or other corresponding information. In some instances, the online concierge system 102 may include an avatar for the user within the shopping gamification interface. In some instances, these coins may be funded by consumer packaged goods (CPG) companies, retailers, and/or other organizations. In these instances, the coins may be optimized via a bidding system from the CPG companies (e.g., whoever pays the most gets the coins, or the like), inventory levels, user preferences, and/or otherwise based on the shopping recommendation information produced by the shopping gamification model at step 505.

In some instances, the avatar may dynamically change based on the shopping environment, aisle, upcoming item, and/or other information. Additionally or alternatively, the online concierge system 102 may generate an on screen alert and/or other information for display on the shopping gamification interface (e.g., visit this aisle and receive a free candy bar, or the like). In some instances, the shopping gamification interface 705 may be generated for display within a mobile application configured for use by a customer and/or shopper (and may, in some instances, be configured with different views based on the corresponding user).

Once generated, the online concierge system 102 may send the shopping gamification interface to the client device 110. In some instances, the online concierge system 102 may also send one or more commands directing the client device 110 to display the shopping gamification interface. In some instances, the online concierge system 102 may send, share, and/or otherwise provide the shopping gamification interface to the client device 110 via a communication interface of the online concierge system 102 and while a wired and/or wireless data connection is established with the client device 110.

At step 507, the client device 110 may receive the shopping gamification interface, sent at step 506. In some instances, the client device 110 may receive and/or otherwise access the shopping gamification interface while a wired or wireless data connection is established with the online concierge system 102. In some instances, the client device 110 may also receive one or more commands directing the client device 110 to display the shopping gamification interface. In some instances, based on or in response to the one or more commands directing the client device 110 to display the shopping gamification interface, the client device 110 may display the shopping gamification interface.

At step 508, the client device 110 may receive user input and/or feedback information via an interface displayed on the client device 110 (e.g., the shopping gamification interface). In some instances, the shopping gamification interface may be displayed within a customer mobile application (e.g., customer mobile application 206) and/or shopper mobile application (e.g., shopper mobile application 212). For example, the client device 110 may receive user input and/or automatically detect that one or more virtual coins was collected/not collected, deviations from the recommended shopping route, whether or not recommended items were added to the cart, preferences for recommended items (e.g., like, dislike, number of stars, and/or other ratings), detected movements within the shopping environment, and/or other information.

Referring to FIG. 5B, at step 509, the client device 110 may communicate this feedback information to the online concierge system 102. For example, the client device 110 may dynamically, and in real time, transmit this information to the online concierge system 102. In some instances, the client device 110 may send, share, and/or otherwise provide the feedback information to the online concierge system 102 while a wired or wireless data connection is established with the online concierge system 102.

At step 510, the online concierge system 102 may update the shopping recommendation information based on the feedback information received at step 509. For example, the online concierge system 102 may input the feedback information into the shopping gamification model as described above at step 505 with regard to input of the store entry/user information. The online concierge system 102 may use the shopping gamification model to update the shopping recommendation information (e.g., the recommended route and items) based on the feedback information (e.g., using similar techniques as those described above with regard to step 505 to initially identify the shopping recommendation information). For example, if the online concierge system 102 received feedback indicating that a particular recommended item (and/or the corresponding virtual coin) was not collected, the shopping gamification model may cause any complementary items, included in the shopping recommendation information, to be removed (e.g., tortillas was skipped, so remove salsa). Additionally or alternatively, the feedback information may indicate that additional, non-recommended items are being collected. In these instances, the shopping gamification model may update the shopping recommendation information to include additional items (which may, e.g., be complementary to those items). Additionally or alternatively, the feedback information may indicate user preferences (e.g., only selecting vegan items), and the online concierge system 102 may adjust the shopping recommendation accordingly. In instances where the online concierge system 102 adjusts the virtual coins for the recommended items, the shopping gamification model may similarly update the recommended shopping route (e.g., so as to avoid the location of any removed items, add the location of any new items, and/or take other actions).

In doing so, the online concierge system 102 may establish a dynamic feedback loop with the client device 110, which may, e.g., cause the online concierge system 102 to continuously refine and/or otherwise update the shopping gamification model based on new and/or additional information (which may, e.g., improve accuracy of the shopping gamification model in predicting items/routes likely to be accepted by a corresponding user).

At step 511, the online concierge system 102 may update the shopping gamification interface based on the updated shopping recommendation information (e.g., generated at step 510). For example, the online concierge system 102 may update the shopping gamification interface to remove one or more of the originally recommended items and their corresponding virtual tokens, and to adjust the recommended shopping route accordingly (e.g., as shown in graphical user interface 710 of FIG. 7B).

Figure 7C:

In some instances, the online concierge system 102 may update the shopping gamification interface to trigger and/or otherwise include one or more live responses (e.g., visual response, audio response, and/or audio response) based on detection (e.g., via the feedback information) that the location of the user device is within a geofence corresponding to a particular item (and/or otherwise detect that the user device is located at the particular item). For example, the online concierge system 102 may update the shopping gamification interface to include an augmented reality component that causes the recommended item to be highlighted in comparison to other shelved items (e.g., as shown in graphical user interface 715, which is shown in FIG. 7C). Although shown as an augmented reality interface, the response may, in some instances, be triggered by the online concierge system 102 at one or more sensors or systems at the location of the item (e.g., cause one or more lights to flash, an audio output, and/or other response), without departing from the scope of the disclosure.

In some instances, the online concierge system 102 may additionally or alternatively update the shopping gamification interface to include an augmented reality component that obscures one or more items at a location of the client device 110 based on dietary preferences and/or restrictions of the user. For example, if the user is a vegetarian, when the client device 110 is located in the frozen food aisle, non-vegetarian items may be obscured through an augmented reality component of the shopping gamification interface (e.g., when the client device 110 is pointed towards the corresponding items). As another example, if the user is on a keto diet, when the client device 110 is located in the cereal section, non-keto options may be obscured through the augmented reality component. Once updated, the online concierge system 102 may send the updated shopping gamification interface to the client device 110. For example, the online concierge system 102 may send, share, and/or otherwise provide the updated shopping gamification interface to the client device 110 via a communication interface and while a wired or wireless data connection is established with the client device 110. In some instances, the online concierge system 102 may also send one or more commands directing the client device 110 to display the updated shopping gamification interface.

At step 512, the client device 110 may receive the updated gamification interface (e.g., sent at step 511). For example, the client device 110 may receive and/or otherwise access the updated gamification interface while a wired and/or wireless data connection is established with the online concierge system 102. In some instances, the client device 110 may also receive one or more commands directing the client device 110 to display the updated gamification interface. At step 513, based on or in response to the one or more commands directing the client device 110 to display the updated gamification interface, the client device 110 may display the updated gamification interface. In some instances, the updated shopping gamification interface may be displayed within a customer mobile application (e.g., customer mobile application 206) and/or shopper mobile application (e.g., shopper mobile application 212).

At step 514, the online concierge system 102 may update the shopping gamification model based on the updated shopping recommendation information. For example, the online concierge system 102 may establish a dynamic feedback loop for the shopping gamification model itself, which may, e.g., cause the online concierge system 102 to continuously refine and/or otherwise update the shopping gamification model based on newly generated outputs (which may, e.g., improve accuracy of the shopping gamification model in predicting items/routes likely to be accepted by a corresponding user).

In some instances, the above described feedback based updates through the shopping gamification model may be continuously and dynamically performed until detection that the shopping trip has come to an end (e.g., as described below at step 515), so as to continue to update and/or otherwise adjust the shopping gamification interface throughout the user's shopping experience. In some instances, by updating the shopping gamification model based on the feedback information and/or shopping recommendation information for the user, the shopping gamification model may be further improved with regard to output generation both for the user, and for other users (e.g., the feedback shopping recommendation information for the user may be used to inform outputs for other users, different than the user). Furthermore, by dynamically learning from feedback information and/or model outputs, the shopping gamification model may improve its ability to steer users to new products and/or shopping environments, and improve the corresponding ability to provide advertisements, offers, or the like (which may, in some instances, be sponsored by consumer packaged goods (CPG) brands and/or otherwise). In some instances, store layouts may be modified based on information obtained through the method described above.

Figure 7D:

At step 515, the client device 110 may execute a checkout process at the shopping location. For example, the client device 110 may engage in a scan and pay and/or other transaction method with a computing device physically located at the shopping location. In doing so, the client device 110 itself and/or the online concierge system 102 may identify that the shopping trip has reached a conclusion, and that all collected virtual coins may be tallied. In these instances, one or more rewards, promotions, discounts, and/or other activities may be applied at checkout based on the collected virtual coins. For example, a given virtual coin may have provided a discount promotion (e.g., generally and/or on a specific item), cash back reward, deal (e.g., buy one get one free), and/or other information. Additionally or alternatively, the user may be able to access certain rewards, promotions, discounts, and/or other activities based on a total number of virtual coins collected. For example, the user may be able to spin a wheel (e.g., on an interface generated by the online concierge system 102 and provided to the client device 110), which may include various promotions to be applied at checkout, in the event that they collected more than a threshold number of the virtual coins. For example, the client device 110 may display a graphical user interface similar to graphical user interface 720, which is depicted in FIG. 7D. In these instances, based on a promotion resulting from the spin of the wheel, the corresponding discount and/or promotion may be applied at checkout. In these instances, the client device 110 may communicate with the scan and pay and/or other checkout system to adjust the final cost of the shopping trip and/or otherwise provide rewards accordingly.

In some instances, the methods described above may be performed in the context of a customer (e.g., engaging in an in-store experience on their own behalf) and/or a shopper (e.g., engaging in an in-store experience on behalf of one or more customers).

Figure 6:
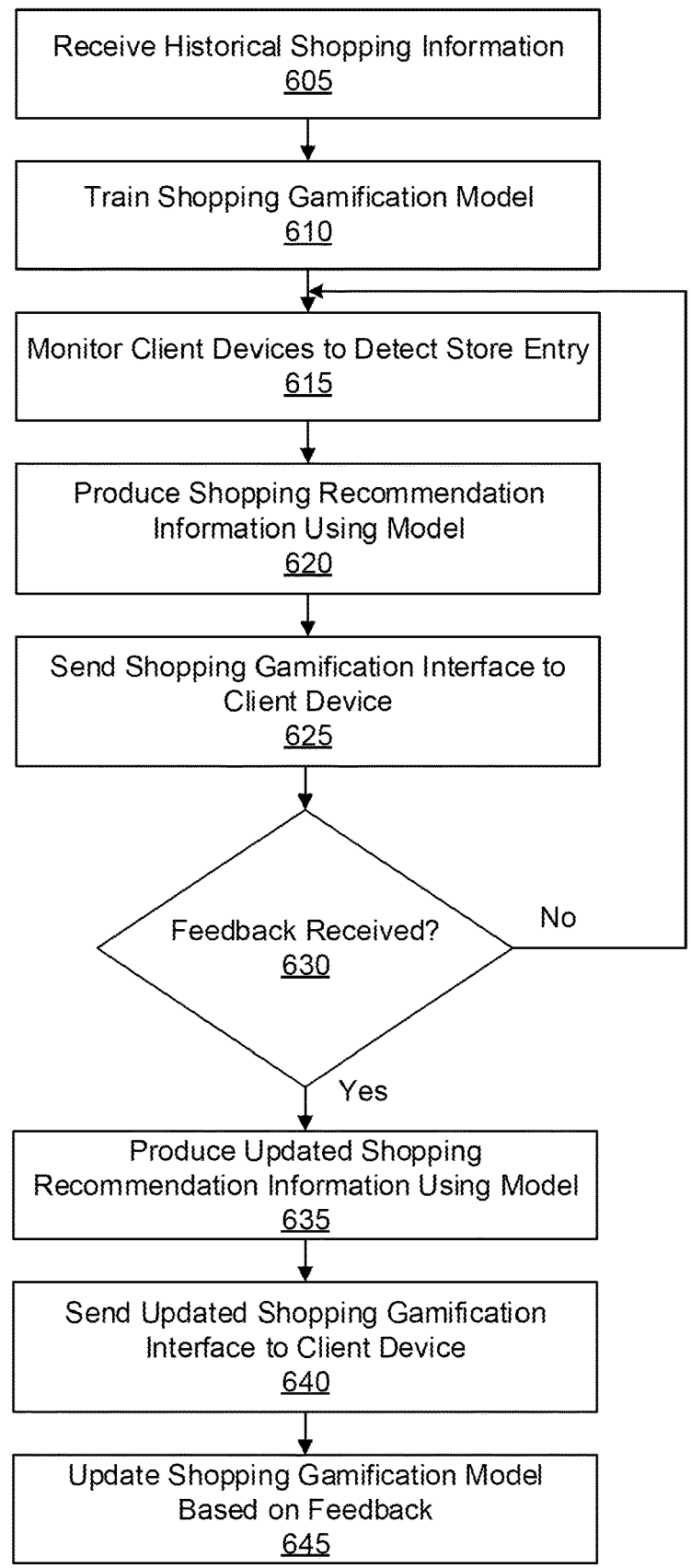
FIG. 6 depicts an illustrative method for a dynamic augmented reality and gamified shopping experience according to one or more illustrative embodiments.

FIG. 6 is a flowchart of one or more embodiments of a method for a dynamic augmented reality and gamified shopping experience. At step 605, a computing platform comprising a memory, one or more processors, and a communication interface may receive historical shopping information. At step 610, the computing platform may train a shopping gamification model using the historical shopping information. At step 615, the computing platform may monitor a client device to detect a store entry. At step 620, the computing platform may input user and/or store information into the shopping gamification model to output shopping recommendation information. At step 625, the computing platform may generate and send a shopping gamification interface, based on the shopping recommendation information, to the client device. At step 630, the computing platform may identify whether or not feedback information was received from the client device. If feedback was not received, the computing platform may return to step 615. Otherwise, if feedback was received, the computing platform may proceed to step 635.

At step 635, the computing platform may produce updated shopping recommendation information using the shopping gamification model. At step 640, the computing platform may generate and send an updated shopping gamification interface (e.g., based on the updated shopping recommendation information) to the client device. At step 645, the computing platform may update the shopping gamification model based on the updated shopping recommendation information. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments, while in other embodiments, the steps of the method are performed by any online system capable of retrieving items.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computing platform comprising:
   at least one processor;
   a communication interface operatively coupled to the at least one processor; and
   memory storing computer-readable instructions that, when executed by the at least one processor, cause the computing platform to:
   receive, from a user device, historical shopping information indicating one or more of: previously purchased items or previous routes within one or more shopping environments taken by a first user of the user device;
   receive location data captured by a location sensor of the user device of the first user, wherein the location data describes a location of the user device;
   detect that the user device is within a geofence associated with a first shopping environment by comparing the location described in the location data to boundaries of the geofence;
   responsive to detecting that the user device is within the geofence, generate augmented reality content depicting a recommended route within the first shopping environment by inputting, into a shopping gamification model, the historical shopping information, wherein generating the augmented reality content comprises:
       accessing data describing a plurality of candidate items within the first shopping environment;
       computing, using the gamification model, an initial score for each of the plurality of candidate items by inputting the historical shopping information into the gamification model;
       identifying a subset of the plurality of candidate items to present to the user based on the initial scores for the plurality of candidate items;
       computing a route score for each of the subset of the plurality of candidate items based on the initial score for each of the plurality of candidate items and a distance between a location of the candidate item in the first shopping environment and an entrance to the first shopping environment;
       generating the recommended route within the first shopping environment based on the route scores for the subset of candidate items;
       receiving image data for an image captured by a camera of the user device of the first user; and
       augmenting the received image data to include the augmented reality content relating to the recommended route;
   send, to the user device, a shopping gamification interface that includes one or more commands directing the user device to display the augmented reality content, wherein sending the one or more commands directing the user device to display the augmented reality content causes the user device to display the augmented reality content through the shopping gamification interface;
   receive, from the user device, user feedback information indicating acceptance or rejection of the recommended route by the first user; and
   dynamically update, based on the user feedback information, the shopping gamification model, wherein updating the shopping gamification model:
       uses the user feedback information for the first user to inform future recommendations for the first user and for other users, different than the first user, and
       refines the shopping gamification model to identify, for any given input:
           a first subset of shopping recommendations for the given input with a corresponding likelihood of acceptance that exceeds a predetermined acceptance threshold, and
           a lowest monetary cost recommendation, of the first subset of the shopping recommendations for the given input, wherein outputting the shopping recommendation information includes outputting the lowest monetary cost recommendation.

2. The computing platform of claim 1, wherein the historical shopping information corresponds only to the first shopping environment.

3. The computing platform of claim 1, wherein the historical shopping information corresponds to a plurality of shopping environments including the first shopping environment.

4. The computing platform of claim 1, wherein the memory stores additional computer-readable instruction that, when executed by the one or more processors, cause the computing platform to:
   input, into the shopping gamification model, a location of the user device within the first shopping environment, wherein the shopping gamification interface is dynamically updated based on the location of the user device within the first shopping environment.

5. The computing platform of claim 1, wherein the memory stores additional computer-readable instruction that, when executed by the one or more processors, cause the computing platform to:
   input, into the shopping gamification model, dietary preference information for the first user, wherein the recommended route is based on the dietary preference information.

6. The computing platform of claim 1, wherein the shopping gamification interface includes one or more virtual coins corresponding to locations of items within the first shopping environment, and wherein the recommended route through the first shopping environment is a route to obtain the one or more virtual coins.

7. The computing platform of claim 6, wherein the one or more virtual coins include one or more of: promotions, points, discounts, or themes.

8. The computing platform of claim 7, wherein the one or more virtual coins may be redeemed at checkout via a scan and pay system.

9. The computing platform of claim 6, wherein the memory stores additional computer readable instructions that, when executed by the one or more processors, cause the computing platform to:
    detect that a location of the user device is within a geofence corresponding to an item associated with the one or more coins; and
    based on the detection that the location of the user device is within the geofence, trigger a live response at a computing device corresponding to the location, wherein the live response comprises one or more of: a visual response or an audio response.

10. The computing platform of claim 9, wherein the shopping gamification interface comprises an augmented reality interface, and wherein the shopping gamification interface is configured to obscure one or more items at the location of the user device based on dietary preferences of the first user.

11. The computing platform of claim 1, wherein the shopping gamification interface includes an avatar for the first user.

12. The computing platform of claim 1, wherein the user device comprises one of: a mobile device, an augmented reality device, or an intelligent shopping cart.

13. The computing platform of claim 1, wherein the user feedback information indicates that a first recommended item was skipped by the first user, and wherein the shopping gamification interface is updated, based on the user feedback information, to remove a second recommended item from the shopping gamification interface.

14. The computing platform of claim 1, wherein the user feedback information indicates that a first recommended item was accepted by the first user, and wherein the shopping gamification interface is updated, based on the user feedback information, to add a second recommended item to the shopping gamification interface.

15. The computing platform of claim 1, wherein the likelihood of acceptance is based on historical acceptance information from a plurality of users, including the first user and at least one other user, different than the first user.

16. A method comprising, at a computing platform comprising at least one processor, a communication interface, and memory:
    receiving, from a user device, historical shopping information indicating one or more of: previously purchased items or previous routes within shopping environments taken by a first user of the user device;
    receiving location data captured by a location sensor of the user device of the first user, wherein the location data describes a location of the user device;
    detecting that the user device is within a geofence associated with a first shopping environment by comparing the location described in the location data to boundaries of the geofence;
    responsive to detecting that the user device is within the geofence, generate augmented reality content depicting a recommended route within the first shopping environment by inputting, into a shopping gamification model, the historical shopping information, wherein generating the augmented reality content comprises:
        accessing data describing a plurality of candidate items within the first shopping environment;
        computing, using the gamification model, an initial score for each of the plurality of candidate items by inputting the historical shopping information into the gamification model;
        identifying a subset of the plurality of candidate items to present to the user based on the initial scores for the plurality of candidate items;
        computing a route score for each of the subset of the plurality of candidate items based on the initial score for each of the plurality of candidate items and a distance between a location of the candidate item in the first shopping environment and an entrance to the first shopping environment;
        generating the recommended route within the first shopping environment based on the route scores for the subset of candidate items;
        receiving image data for an image captured by a camera of the user device of the first user; and
        augmenting the received image data to include the augmented reality content relating to the recommended route;
    sending, to the user device, a shopping gamification interface that includes one or more commands directing the user device to display the augmented reality content, wherein sending the one or more commands directing the user device to display the augmented reality content causes the user device to display the augmented reality content through the shopping gamification interface;
    receiving, from the user device, user feedback information indicating acceptance or rejection of the recommended route by the first user; and
    dynamically updating, based on the user feedback information, the shopping gamification model, wherein updating the shopping gamification model:
        uses the user feedback information for the first user to inform future recommendations for the first user and for other users, different than the first user, and
        refines the shopping gamification model to identify, for any given input:
            a first subset of shopping recommendations for the given input with a corresponding likelihood of acceptance that exceeds a predetermined acceptance threshold, and
            a lowest monetary cost recommendation, of the first subset of the shopping recommendations for the given input, wherein outputting the shopping recommendation information includes outputting the lowest monetary cost recommendation.

17. The method of claim 16, wherein the historical shopping information corresponds only to the first shopping environment.

18. One or more non-transitory computer-readable media storing instructions that, when executed by a computing platform comprising at least one processor, a communication interface, and memory, cause the computing platform to:
    receive, from a user device, historical shopping information indicating one or more of: previously purchased items or previous routes within one or more shopping environments taken by a first user of the user device;
    receive location data captured by a location sensor of the user device of the first user, wherein the location data describes a location of the user device;
    detect that the user device is within a geofence associated with a first shopping environment by comparing the location described in the location data to boundaries of the geofence;
    responsive to detecting that the user device is within the geofence, generate augmented reality content depicting a recommended route within the first shopping environment by inputting, into a shopping gamification model, the historical shopping information, wherein generating the augmented reality content comprises:
  accessing data describing a plurality of candidate items within the first shopping environment;
  computing, using the gamification model, an initial score for each of the plurality of candidate items by inputting the historical shopping information into the gamification model;
  identifying a subset of the plurality of candidate items to present to the user based on the initial scores for the plurality of candidate items;
  computing a route score for each of the subset of the plurality of candidate items based on the initial score for each of the plurality of candidate items and a distance between a location of the candidate item in the first shopping environment and an entrance to the first shopping environment;
  generating the recommended route within the first shopping environment based on the route scores for the subset of candidate items;
  receiving image data for an image captured by a camera of the user device of the first user; and
  augmenting the received image data to include the augmented reality content relating to the recommended route;
send, to the user device, a shopping gamification interface that includes one or more commands directing the user device to display the augmented reality content, wherein sending the one or more commands directing the user device to display the augmented reality content causes the user device to display the augmented reality content through the shopping gamification interface;
receive, from the user device, user feedback information indicating acceptance or rejection of the recommended route by the first user; and
dynamically update, based on the user feedback information, the shopping gamification model, wherein updating the shopping gamification model:
  uses the user feedback information for the first user to inform future recommendations for the first user and for other users, different than the first user, and
  refines the shopping gamification model to identify, for any given input:
    a first subset of shopping recommendations for the given input with a corresponding likelihood of acceptance that exceeds a predetermined acceptance threshold, and
    a lowest monetary cost recommendation, of the first subset of the shopping recommendations for the given input, wherein outputting the shopping recommendation information includes outputting the lowest monetary cost recommendation.

\* \* \* \* \*